June 14, 1966     M. E. SIMARD ETAL     3,255,859
DISPENSING APPARATUS
Filed June 18, 1962     2 Sheets-Sheet 1
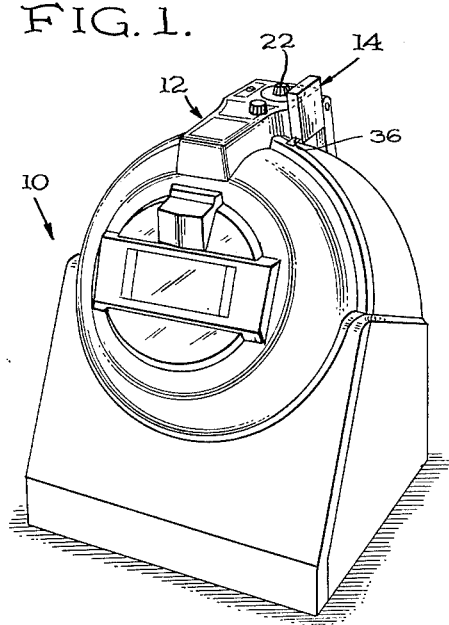
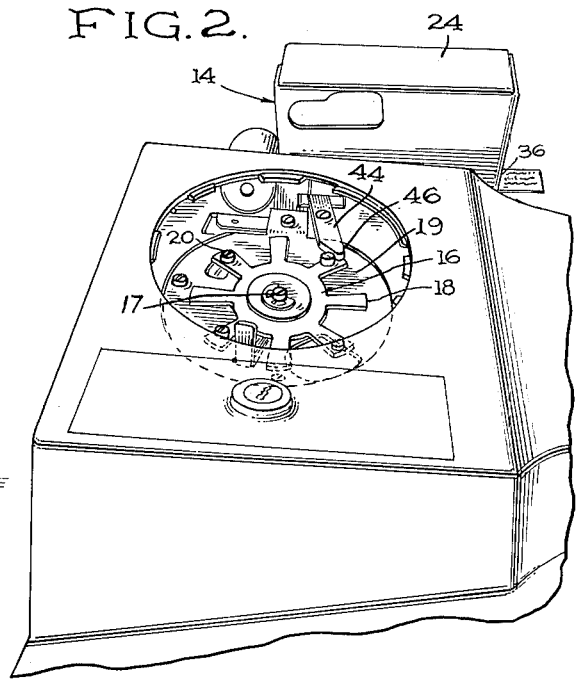
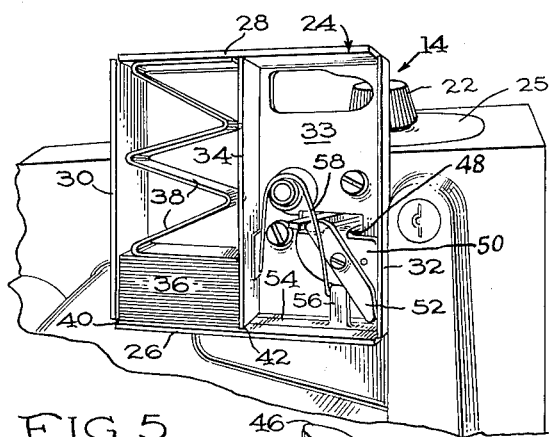
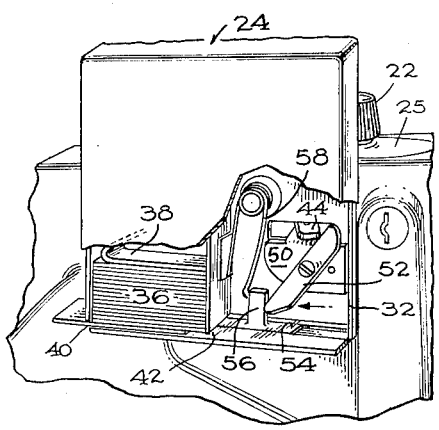
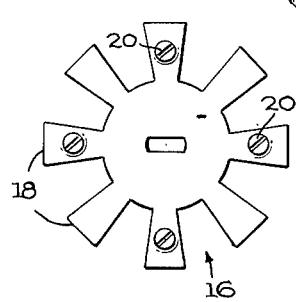
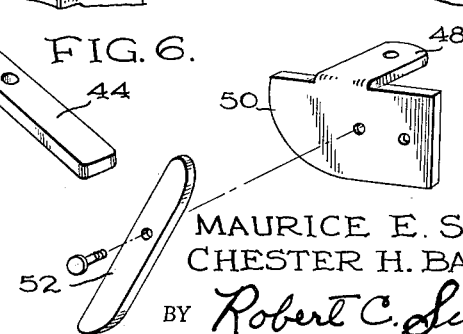
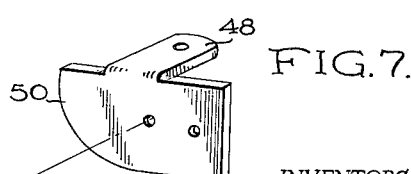
INVENTORS
MAURICE E. SIMARD
CHESTER H. BANKER
BY Robert C. Sullivan
ATTORNEY June 14, 1966  M. E. SIMARD ETAL  3,255,859
DISPENSING APPARATUS
Filed June 18, 1962  2 Sheets-Sheet 2

INVENTORS
MAURICE E. SIMARD
CHESTER H. BANKER
BY Robert C. Sullivan
ATTORNEY

United States Patent Office 3,255,859
Patented June 14, 1966

3,255,859
DISPENSING APPARATUS
Maurice E. Simard, 116 French St., Bristol, Conn., and Chester H. Banker, 1173 Peck Lane, Cheshire, Conn.
Filed June 18, 1962, Ser. No. 203,268
1 Claim. (Cl. 194—85)

This invention relates to an apparatus for dispensing profit tabs, trading stamps and the like for use with coin-operated appliances such as automatic washers and dryers, and to the combination of such a dispensing apparatus with a coin-operated appliance.

During recent years, there has been an increasingly widespread use of premiums such as trading stamps, profit tabs, and the like with the sale of merchandise, these items being given to the customer in proportion to his purchases as an incentive to do business with the merchant offering such premiums. The use of such premiums has also extended into other fields such as automatic laundries and the like, where premiums such as trading stamps are frequently given to customers of such establishments in order to encourage their patronage.

A particular problem is presented in connection with the distribution of trading stamps and the like in self-service establishments such as laundromats or automatic laundries in which the customer pays for the use of the automatic washer or dryer by depositing a coin in the coin-operated starting mechanism for the appliance, since such establishments are frequently unattended by operating personnel, or attended only by a minimum of operating personnel.

Accordingly, it is an object of this invention to provide a dispensing mechanism for coin-operated appliances such as automatic washers or dryers in which a premium such as a ticket, trading stamp or the like is automatically dispensed upon the deposit of a coin in the appliance to begin operation of the appliance.

It is another object of the invention to provide in combination with a coin-operated appliance such as an automatic washer or dryer a dispensing mechanism which co-operates with the coin-operated starting mechanism of the appliance to automatically dispense a ticket, trading stamp or the like to the customer upon deposit of the proper coin in the starting mechanism.

Another object of the invention is to provide a dispensing mechanism for attachment to and cooperation with the starting mechanism of a coin-operated appliance which is inexpensive to manufacture and install and which is relatively uncomplicated in construction and efficient in operation.

In achievement of these objectives, there is provided in accordance with this invention the combination with a coin-operated automatic appliance such as an automatic washer an apparatus for dispensing profit tabs, trading stamps and the like. The dispensing apparatus includes a lever system which actuates a ticket-ejecting slide, the lever system being actuated by a rotary clutch member which forms a part of the coin-operated starting mechanism for the automatic appliance. The rotary clutch member is angularly indexed each time a control knob of the coin-operated starting mechanism is rotated to START position to initiate the washing cycle after a coin has been deposited in the coin magazine. During its indexing movement when a coin is deposited, the rotary clutch member actuates the lever system of the dispensing apparatus to cause movement of the ticket ejecting slide.

In a modified embodiment of the invention, the lever system which actuates the ticket ejecting slide is operated by a solenoid member which is energized by the dropping of a coin into the coin slot of the machine.

Throughout the specification, the term "ticket" will be used to designate the item which is being dispensed. However, it will be understood that this term is also intended to include any analogous items, such as profit tabs, trading stamps, or the like.

Further objects and advantages of the invention will become apparent from the following description taken in conjunction with the accompanying drawing in which:

FIGURE 1 is a perspective view of a coin-operated automatic washing machine having installed thereon the ticket dispensing device of the invention;

FIGURE 2 is an enlarged view of the coin-operated starting mechanism of the machine, showing the relation of the coin-operated starting mechanism to the ticket dispensing mechanism;

FIGURE 3 is a view in elevation of a portion of the ticket dispensing mechanism with the cover thereof removed, and with the elements of the ticket dispensing mechanism in the position corresponding to the beginning of the ticket dispensing operation;

FIGURE 4 is a view in elevation of the ticket dispensing mechanism showing the ticket dispensing mechanism in a position corresponding to an intermediate phase of the ticket ejecting operation in which the ticket has been partially ejected;

FIGURE 5 is a view of the rotary clutch member which forms a part of the coin-operated starting mechanism and which actuates the ticket dispensing lever system;

FIGURE 6 is a perspective view of the operating lever member which is engaged by the rotary clutch member of FIGURE 5;

FIGURE 7 is a perspective exploded view of a second lever member which engages the ticket ejecting slide, together with the supporting bracket on which both the first and second lever members are pivotally supported;

Figure 8:
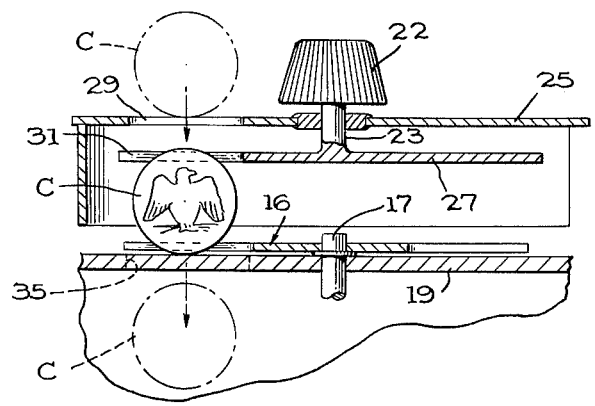
FIGURE 8 is a semi-diagrammatic view of the coin starting mechanism illustrating how the coin which is inserted in the coin slot forms a mechanical connection between the operating knob of the starting device and the clutch member which actuates the lever system of the ticket dispensing mechanism.

Referring now to the drawing, there is shown in FIGURE 1 a coin-operated laundry appliance which in the illustrated embodiment is a coin-operated automatic washing machine generally indicated at 10. Mounted on the upper portion of the washer 10 is the coin-operated starting device and coin magazine generally indicated at 12, on one side of which is mounted the ticket dispensing device generally indicated at 14.

As best seen in FIGURE 2, the coin-operated starting mechanism includes a rotary clutch member generally indicated at 16 which is rotatably mounted on axis 17 for step-by-step rotary indexing movement in a horizontal plane upon successive deposits of coins to initiate successive washing cycles. Rotary clutch member 16 includes a plurality of radial arms or spokes 18. In the illustrated embodiment, the rotary clutch member 16 includes eight radial arms 18 which are displaced from each other by angular spacings of 45 degrees. Alternate radial arms have a vertically upstanding screw or stud 20 attached near the radially outer end of the respective arm 18 on which it is mounted.

As best seen in FIGURE 8, the control knob 22 of the coin operated starting mechanism is mounted on a shaft 23 which projects through removable cover plate 25 of the coin box housing. A disc member 27 is fixed to the lower end of shaft 23 and is rotatable through a predetermined angular arc in a horizontal plane within the interior of the coin box, and in a plane parallel to but spaced vertically above the horizontal plane of clutch member 16. The underneath surface of clutch 16 lies just slightly above the upper horizontal surface of partition 19.

The stationary cover plate 25 has a coin slot 29 therein, and the rotatable disc 27 on shaft 23 also has a coin slot 31 therein. Until a coin is inserted through slot 29 of cover plate 25 and received in slot 31 of disc 27, knob 22 and attached disc 27 may be moved freely in either a clockwise or counterclockwise direction through a predetermined arc as determined by stops at opposite ends of the path of travel of disc 27. During this movement of disc 27 and in the absence of a coin in slot 31 of disc 27, the disc has no mechanical connection to clutch 16.

To initiate the cycle of laundry machine or other appliance 10, and also to actuate the ticket dispensing mechanism, the control knob 22 is rotated in a counterclockwise direction to align or register the slot 31 of movable disc 27 with the fixed slot 29 of cover plate 25. A fixed stop mounted on the coin box housing in the path of rotatable disc 27 stops the counterclockwise rotation of disc 27 at a point where slot 31 of disc 27 is in registry with slot 29 of cover plate 25.

A coin C of the proper denomination, such as a twenty-five cent piece, for example, is then inserted through slot 29 in cover plate 25. The coin passes through the aligned slot 31 of disc 27, and the lower edge of the coin comes to rest on the upper surface of horizontal partition 19. The vertical spacing between disc 27 and the upper surface of partition 19 is such that when the lower edge of the coin rests on the upper surface of partition 19, the upper edge of the coin is still received within the slot 31 of disc 27.

Knob 22 is then rotated in a clockwise direction, causing the coin, held in slot 31 of disc 27, to move with disc 27, the lower edge of the coin moving along the upper surface of horizontal partition 19, and the leading edge of the coin bearing against the adjacent arm 18 of clutch 16 to impart a clockwise movement to clutch 16. After a predetermined angular rotation of knob 22 and disc 27, coin C passes over a slot 35 in partition 19 and drops into a coin receptacle beneath partition 19. When this occurs, the mechanical connection between disc 27 and clutch 16 is broken. The coin slot 35 through which the coil C drops into the coin receptacle is so located with respect to the point at which the coin first establishes a driving connection between disc 27 and clutch 16 that clutch 16 is rotatably indexed substantially 90 degrees for each deposit of a coin.

The 90-degree rotation of rotary member 16 obtained by movement of control knob 22 to START position corresponds to the angular spacing between successive screw members 20. The rotation of member 16 by movement of knob 22 to START position is effective to actuate suitable electrical contacts in the electrical control system of the automatic appliance to initiate the cycle of operation of the automatic appliance.

Rotary clutch member 16 is indexed as just described only once in each cycle of operation of the appliance and is not indexed again to dispense a ticket until the control knob 22 is moved to START position after another coin has been deposited to initiate another cycle of operation. To begin another cycle of operation, control knob is again manually rotated in a counterclockwise direction to bring the slot 31 of disc 27 into registry with slot 29 of cover plate 25 to receive another coin.

The ticket dispensing device includes a housing 24 which is vertically mounted on the side wall of the housing for the starting mechanism and coin magazine 12. Housing 24 includes a bottom wall 26, a top wall 28, opposite side walls 30, 32, a rear wall 33, and is divided into two side-by-side vertical compartments by a center vertical partition 34. The compartment on the left with respect to the views in FIGURES 3 and 4 serves as a storage chamber for a plurality of tickets 36 which are biased by a spring member 38 to the lower end of the ticket chamber. Side wall 30 is provided at its lower edge with a slot 40 through which tickets may be ejected to the customer by the dispensing mechanism as will be described hereinafter. Also, the lower end of center partition 34 is spaced from the bottom wall 26 of housing 24 to provide a slot 42 through which the ticket ejecting mechanism moves into engagement with the lowermost of the stacked tickets 36 to permit ejection of the lowermost ticket as will be described in more detail hereinafter.

The mechanism for dispensing the tickets includes a lever member 44 which is pivotally supported substantially at its midpoint for movement in a horizontal plane by a horizontal bracket arm 48 extending from vertical bracket 50 mounted on the rear wall 33 of ticket dispenser housing 24. Lever 44 projects through suitable openings in the rear wall 33 of ticket dispenser housing 24 and in the adjacent abutting wall of the housing for starting device and coin magazine 12 to permit the tapered end 46 of lever 44 to project into the peripheral path of movement of the vertical screw or stud members 20 of alternate radial arms 18 of rotary clutch member 16.

A second lever 52 is supported for pivotal movement in a vertical plane by the vertical bracket 50 entirely within housing 24. Vertical lever 52 is so positioned that it is engaged by and in the path of movement of the end of horizontal lever 44 which projects into ticket dispenser housing 24. The lower end of lever 52 is in abutting relation to upstanding arm 56 of a horizontal slider 54 which is slidably movable along the inner surface of bottom wall 26 of housing 24 and through slot 42 into engagement with the lowermost ticket 36 to cause ejection of the ticket 36 through slot 40. A suitable guide or track is provided to insure linear sliding movement of slider 54. A torsion spring 58 bears against the upstanding arm 56 of slider 54 in such manner as to constantly urge slider 54 to the right with respect to the views shown in FIGURES 3 and 4, that is, to a position in which the slider 54 is in inactive or non-ejecting position. Movement of slider 54 to its inactive position shown in FIGURE 3 due to the force of spring 58 causes a corresponding movement of levers 52 and 44 to their inactive positions due to the abutting relation of slider 54 with lever 52 and the abutting relation between levers 52 and 44.

In the operation of the ticket dispensing device, the customer using the automatic laundry appliance such as the washing machine 10 rotates knob 22 to align the slot 31 of disc 27 with slot 29 of cover plate 25 and drops the proper coin in the slot 29. The customer then manually turns the control knob 22 in a clockwise direction to the START position. The clockwise manual rotation of knob 22 rotates the rotary clutch 16 in a clockwise direction through an arc of substantially 90 degrees due to the mechanical connection formed by the coin between disc 27 and clutch 16, and causes one of the upstanding screws 20 on one of the radial arms 18 to engage the horizontally movable pivoted lever 44. When screw 20 of arm 18 first engages lever 44, lever 44 is in the position shown in FIGURE 3 at the extreme left of its path of movement, and the vertical lever 52 and the ticket ejecting slide 54 are respectively in the inactive positions shown in FIGURE 3. The engagement of the screw 20 with the horizontally movable lever 44 moves lever 44 through an arcuate path in a counterclockwise direction about its pivotal support to cause lever 44 to move beyond the position shown in FIGURE 4 in the direction of wall 32. In so doing, the end of lever 44 which engages the upper end of vertical lever 52 moves the upper end of lever 52 in a clockwise direction about its horizontal pivotal axis beyond the position shown in FIGURE 4 in the direction of wall 32. As the vertical lever 52 pivotally moves as just described, due to the engagement of the lower end of lever 52 with vertical arm 56 on slider 54, slider 54 is moved to the left, beyond the position shown in FIGURE 4, the end of slider 44 moving through the space or slot 42 beneath partition 34 and into engagement with the lowermost ticket 36, the extent of movement of slider 44 being such as to cause the lowermost ticket 36 to be ejected from the ticket dispenser housing. As soon as the levers 44, 52 and the slider 54 have moved through paths sufficient to eject the lowermost ticket 36, the screw 20 clears the tapered end 46 of lever 44 and permits torsion spring 58 to return slider 54 and levers 52 and 44 to the inactive position shown in FIGURE 3, ready for the next ticket ejecting cycle of operation initiated by the next deposit of a coin in the coin magazine.

Figure 9:
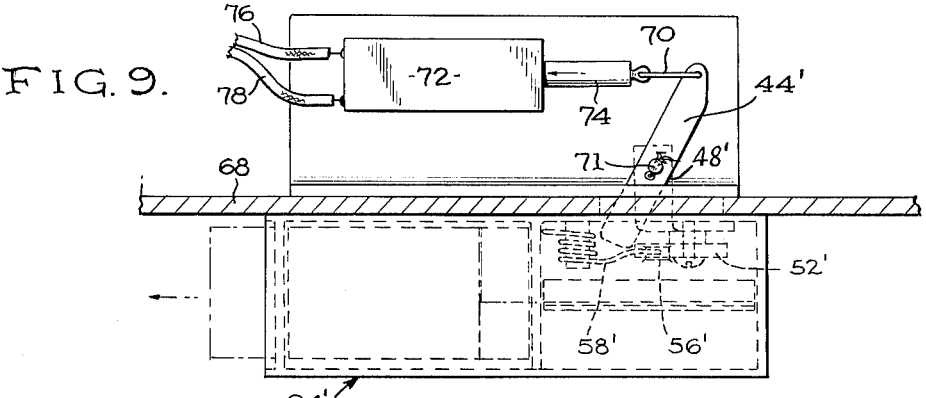
FIGURE 9 is a top plan view of the modified embodiment of the invention in which an electrical solenoid operates the ticket dispensing mechanism.
Figure 10:
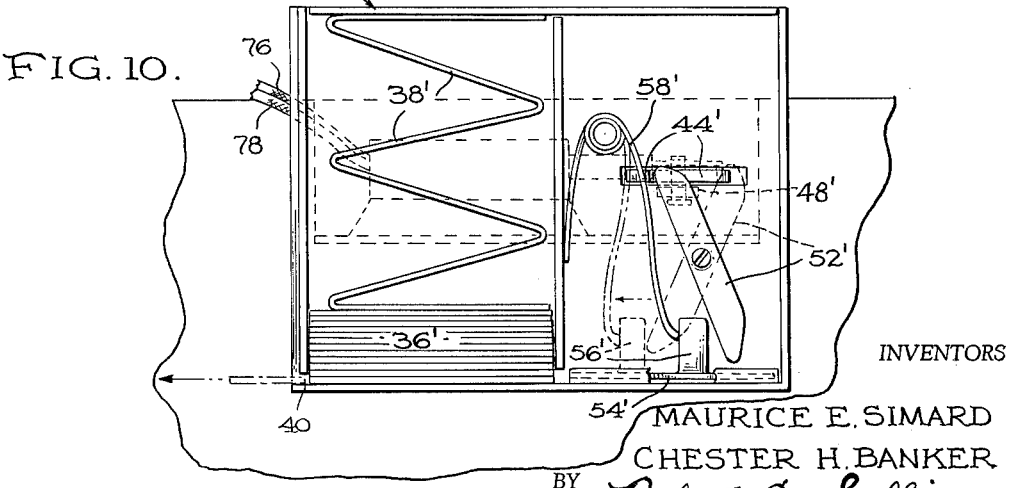
FIGURE 10 is a side elevation view, with the cover or end plate removed, illustrating the ticket dispensing mechanism of FIGURE 9.

There is shown in FIGURES 9 and 10 a modified embodiment of the ticket dispensing mechanism which is operated by an electrical solenoid instead of by the rotatably indexed member 16 of the embodiment of FIGS. 1–8.

In the modified embodiment, the ticket dispensing device includes a housing 24' mounted on one side of a panel 68. The housing 24' and the lever and ticket ejecting mechanism contained therein are similar to the housing 24, levers 44, 52, ticket ejecting slide 54, upstanding arm 56, and spring 58 described hereinbefore and shown in FIGURES 3, 4, 6 and 7 of the drawings and will not be described in detail again. Corresponding members in the modified embodiment of FIGURES 9 and 10 are designated by primed reference numerals corresponding to similar reference numerals for the embodiment of FIGURES 3, 4, 6 and 7.

Horizontal lever arm 44' projects through suitable openings in the abutting walls of housing 24' and panel 68 and is pivotally supported intermediate its length by bracket arm 48' at a pivot point 71 located outside housing 24'. The outer end of lever 44' is connected by a link 70 to the linearly movable plunger 74 of an electrical solenoid 72. Solenoid 72 is suitably connected to electrical power by conductors 76 and 78 in series with a microswitch or other suitable switch which is momentarily closed by the dropping of a coin into the coin box of the appliance to which the ticket-dispensing device is attached. The dropping of the coin into the coin box also actuates a suitable switch which initiates the cycle of operation of the appliance. Momentary energization of solenoid 72 pulls plunger 74 into the core of the solenoid and, in so doing, moves the pivoted lever 44' in a counterclockwise direction with respect to the view shown in FIGURE 9. Lever 44' lies in a horizontal plane and engages the upper end of vertical lever 52' to swing lever 52' about its pivotal support in a clockwise direction from the full line to the dotted line position of FIGURE 10. The lower end of lever 52' engages vertical arm 56' of slider 54' to cause ejection of the ticket, all as previously described in the embodiment of FIGURES 1–8. Upon deenergization of solenoid 72 due to the completion of the passage of the coin, the spring 58' returns the slide 54', the vertical pivoted lever 52' and the horizontal pivoted lever 44' to their original inactivated positions. The return of lever 44' to its inactive position shown in full line in FIGURE 9 also withdraws the plunger 74 from the core of solenoid 72. Solenoid 72 may be provided with a spring which normally biases the plunger 74 to its inactive position and thus would return plunger 74 to the inactivated position shown in FIGURE 9 upon deenergization of the solenoid.

While the term "coin" has been used throughout the specification and claim, this term also includes a coin-like token which might be used to initiate operation of the appliance.

It can be seen from the foregoing that there is provided in accordance with this invention a ticket dispensing device which has great utility, particularly in connection with automatic coin-operated laundry machines and the like, and which permits tickets, trading stamps, profit tabs or other premiums to be automatically dispensed to the user of the coin-operated appliance upon the deposit of a coin in the coin magazine of the appliance.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What we claim as our invention is:

In a coin operated apparatus including a coin box having a first coin slot, a first rotary member mounted within said coin box for rotation in a first plane, said first rotary member having a second coin slot therein, said first rotary member being rotatable to a position in which said second coin slot is in registry with said first coin slot, a second rotary member positioned in axially spaced relation to said first rotary member and rotatable in a second plane parallel to the plane of rotation of said first rotary member, said second rotary member including a central hub and a plurality of circumferentially spaced radial arms extending from said hub, said second rotary member being mounted for rotary indexing movement about an axis passing through said hub, abutment means on at least one of said radial arms, a support surface positioned in said coin box beneath said second rotary member in supporting relation to the lower edge of a coin whose upper edge is received in said second coin slot, whereby said coin is rotatably moved along said support surface by rotation of said first rotary member, at least one of said radial arms of said second rotary member including an edge portion lying in the path of movement of said coin whereby the coin being rotatably moved by said first rotary member abuts against said edge portion and establishes a driving connection from said first rotary member to rotate said second rotary member, said support surface being provided with discharge means for said coin so located as to permit driving connection between said first and second rotary members for only a predetermined distance, a first lever member mounted for pivotal movement in a common plane with said abutment means and adapted to be engaged by said abutment means whereby said second rotary member during its indexing movement imparts a predetermined pivotal movement to said first lever member, a second lever member pivotally mounted for movement in a plane substantially perpendicular to the plane of said first lever member and intersecting the path of movement of said first lever member, whereby pivotal movement of said first lever member imparts a predetermined pivotal movement to said second lever member, a premium dispensing device including a premium ejecting member and a premium storage chamber, said premium ejecting member being mounted in the path of movement of said second lever member and being mounted for sliding movement in a linear direction into said premium storage chamber, said second lever member engaging said ejecting member whereby pivotal movement of said second lever member imparts linear sliding movement to said ejecting member into said premium storage chamber to cause ejection of a premium therefrom.

References Cited by the Examiner
UNITED STATES PATENTS

| | | | |
|---|---|---|---|
| 882,923 | 3/1908 | Becker et al. | 194—85 |
| 1,089,206 | 3/1914 | Gaibis | 194—10 |
| 1,460,878 | 7/1923 | Allen | 133—5 |
| 2,044,110 | 6/1936 | Walker | 194—88 |
| 2,070,445 | 2/1937 | Miller et al. | |
| 2,672,968 | 3/1954 | Greenwald | 194—9 |

HUGO O. SCHULZ, *Primary Examiner.*

SAMUEL F. COLEMAN, *Examiner.*

H. C. HORNSBY, *Assistant Examiner.*